United States Patent
Ga et al.

(10) Patent No.: US 12,466,393 B2
(45) Date of Patent: Nov. 11, 2025

(54) DRIVING FORCE ADJUSTING DEVICE AND ADJUSTING METHOD

(71) Applicants: Hyundai Motor Company, Seoul (KR); Kia Corporation, Seoul (KR)

(72) Inventors: Han Seon Ga, Gwangmyeong-Si (KR); Sang Wook Han, Seoul (KR); Jin Seok Song, Bucheon-Si (KR); Kweon Soo Jeon, Seoul (KR); Nam Han Kim, Bucheon-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 99 days.

(21) Appl. No.: 18/385,261

(22) Filed: Oct. 30, 2023

(65) Prior Publication Data

US 2025/0018928 A1    Jan. 16, 2025

(30) Foreign Application Priority Data

Jul. 12, 2023   (KR) .......................... 10-2023-0090187

(51) Int. Cl.
*B60W 30/045* (2012.01)
*B60W 10/14* (2012.01)

(52) U.S. Cl.
CPC .......... *B60W 30/045* (2013.01); *B60W 10/14* (2013.01)

(58) Field of Classification Search
CPC .............. B60W 30/045; B60W 10/14; B60W 2520/26; B60W 30/18172; B60W 50/10; B60W 50/085; B60W 2520/263; B60W 30/02; B60W 2520/403; B60W 2540/16; B60W 2540/215; B60W 2720/26; B60W 2720/263; B60W 2720/403;
(Continued)

(56) References Cited

U.S. PATENT DOCUMENTS

| 10,384,538 B2 | 8/2019 | Cho |
| 11,247,561 B2 | 2/2022 | Gully |

(Continued)

FOREIGN PATENT DOCUMENTS

| CN | 115246413 A | 10/2022 |
| DE | 102020204991 A1 * | 10/2021 |

(Continued)

OTHER PUBLICATIONS

DE102020204991A1—English Translation (Year: 2021).*
FR3072068—English Translation (Year: 2019).*

*Primary Examiner* — Scott A Reinbold
(74) *Attorney, Agent, or Firm* — Morgan Lewis & Bockius LLP

(57) ABSTRACT

A driving force adjusting device includes an input unit configured for receiving an input of a selection distribution ratio, which is a ratio of driving force generation of front wheels and rear wheels selected by a user, a receiving unit configured for receiving driving information of a vehicle, a driving force determination unit configured for determining a driving force distribution ratio, which is a driving force generation ratio of the front wheels and the rear wheels, and determining driving force of the front wheels and the rear wheels using the driving force distribution ratio, and a driving control unit configured for controlling a driving unit generating driving force of the vehicle based on the driving force determined by the driving force determination unit.

18 Claims, 8 Drawing Sheets

[FRONT WHEEL DRIVING FORCE: REAR WHEEL DRIVING FORCE]

(58) Field of Classification Search
CPC ......... B60W 2720/406; B60W 30/188; B60W 2520/10; B60W 2520/14; B60W 2540/18; B60W 2552/40; B60K 28/16; B60Y 2300/82; B60Y 2300/188
USPC .......................................................... 701/82
See application file for complete search history.

(56) References Cited

U.S. PATENT DOCUMENTS

| | | | |
|---|---|---|---|
| 2019/0077258 A1* | 3/2019 | Cho | B60K 6/52 |
| 2020/0139978 A1 | 5/2020 | Yamazaki et al. | |
| 2022/0194378 A1* | 6/2022 | Sullivan | B60L 7/24 |

FOREIGN PATENT DOCUMENTS

| | | | | |
|---|---|---|---|---|
| FR | 3072068 A1 * | 4/2019 | ............... | B60K 6/52 |
| WO | WO 2019/073136 A1 | 4/2019 | | |

* cited by examiner

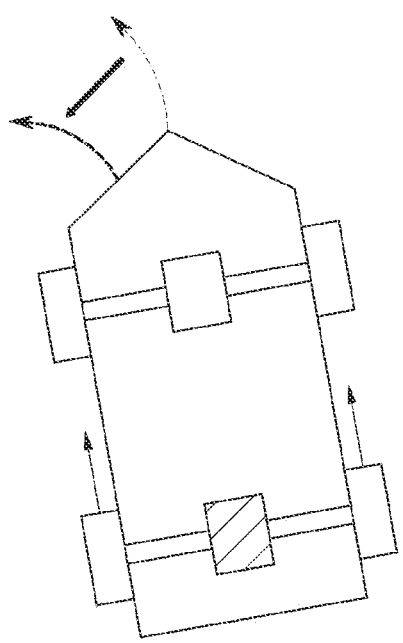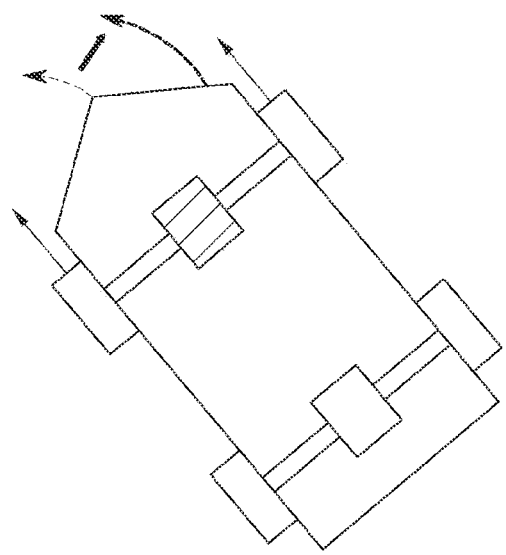
FIG. 5A
FIG. 5B

DRIVING FORCE ADJUSTING DEVICE AND ADJUSTING METHOD

CROSS-REFERENCE TO RELATED APPLICATION(S)

The present application claims priority to Korean Patent Application No. 10-2023-0090187 filed on Jul. 12, 2023, the entire contents of which is incorporated herein for all purposes by this reference.

BACKGROUND OF THE PRESENT DISCLOSURE

Field of the Present Disclosure

The present disclosure relates to a driving force adjusting device and adjusting method.

Description of Related Art

In all wheel drive systems of the related art, the driving source from one power source (for example, an internal combustion engine) is distributed to the front and rear wheels through clutch control. In the all-wheel drive system of the related art, driving force tip to 50:50 between the front and rear wheels may be distributed by fully engaging the clutch, but 50 percent or more of the driving force cannot be applied to the driving wheels to which the power source is not directly connected.

In contrast, recent all-wheel drive systems have used two or more motors or a hybrid engine to freely distribute driving force between the front and rear wheels, from 100 percent to the front wheels to 100 percent to the rear wheels.

Accordingly, the user may adjust the front-wheel and rear-wheel driving force distribution ratio to experience and select ride comfort according to front-wheel driving and rear-wheel driving using the same vehicle.

However, in the case in which the driving force distribution ratio selected by the user is maintained when the vehicle is turning or the like, oversteer, understeer, or excessive wheel slip may occur, impairing driving stability.

On the other hand, when adjusting the driving force of the front and rear wheels for driving stability, there is a problem in which the user cannot feel the riding comfort selected by the user.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a driving force adjusting device and adjusting method, in which driving stability of a vehicle may be secured while maintaining maximum riding comfort according to a driving force distribution ratio selected by a user.

According to an aspect of the present disclosure, a driving force adjusting device includes an input unit configured for receiving an input of a selection distribution ratio, which is a ratio of driving force generation of front wheels and rear wheels selected by a user; an in more detail, receiving driving information of a vehicle; a driving force determination unit configured for determining a driving force distribution ratio, which is a driving force generation ratio of the front wheels and the rear wheels, and determining driving force of the front wheels and the rear wheels using the driving force distribution ratio; and a driving control unit configured for controlling a driving unit generating driving force of the vehicle based on the driving force determined by the driving force determination unit. The driving force determination unit is configured to adjust the driving force distribution ratio based on the driving information and the selection distribution ratio.

The driving force distribution ratio may include a first driving force distribution ratio, and the driving force determination unit may be configured to determine the first driving force distribution ratio in which the selection distribution ratio is reset within a preset initial setting range, as the driving force distribution ratio.

The initial setting range may further include a range in which the front wheels may be driven by a preset margin range even when the selection distribution ratio is input to drive only the front wheels, or further include a range in which the rear wheels are capable of being driven by a preset margin range even when the selection distribution ratio is input to drive only the rear wheels.

The driving unit may include a first driving unit configured for generating a driving force to at least one of the front or rear wheels of the vehicle, and a second driving unit configured for generating a driving force to another of the front or rear wheels of the vehicle.

The driving force distribution ratio may include a second driving force distribution ratio, and the driving force determination unit may be configured to determine a first additional distribution ratio in consideration of a friction coefficient of a road surface on which the vehicle is traveling and the selection distribution ratio, and may additionally apply the first additional distribution ratio to the driving force distribution ratio.

The driving force distribution ratio may further include a third driving force distribution ratio, and the third driving force distribution ratio may be determined by additionally applying a second additional distribution ratio according to occurrence of understeer or oversteer of the vehicle to the driving force distribution ratio.

When the vehicle understeers, the second additional distribution ratio may be determined according to an understeer index (US Index) indicating a degree to which understeer has occurred, within a preset marginal additional distribution ratio.

When the vehicle oversteers, the second additional distribution ratio may be determined by a weight determined by considering at least one of an oversteer index (OS Index) indicating a degree to which oversteer has occurred, a friction coefficient of a road surface on which the vehicle is traveling, and the selection distribution ratio.

The driving unit may include a first driving unit configured for generating a driving force to at least one of the front wheels or the rear wheels of the vehicle, and a second driving unit configured for generating a driving force to another one of the front wheels or the rear wheels of the vehicle, and the driving force determination unit may further include a driving force redistribution unit that adjusts the driving force of the first driving unit and the driving force of the second driving unit distributed based on the driving force distribution ratio and redistributes the driving force to the first driving unit and the second driving unit.

When wheel slip exceeding an allowable wheel slip occurs in one of the first driving unit and the second driving unit, the driving force redistribution unit may reduce the driving force distributed to one of the first driving unit and the second driving unit, in which the wheel slip exceeding the allowable wheel slip has occurred, and may redistribute reduced driving force to another of the first driving unit and the second driving unit.

Whether the wheel slip exceeding the allowable wheel slip occurs may be determined by whether a wheel slip error, determined by a magnitude of a received wheel slip exceeding a target wheel slip, exceeds a preset allowable wheel slip, and the target wheel slip may be a wheel slip required for the vehicle to drive on a target path.

The target wheel slip may be set individually for the front wheels and the rear wheels, and when the selection distribution ratio is set to be greater for the front wheels, a target wheel slip for the front wheels may be set to be greater than for the rear wheels, and when the selection distribution ratio is set to be greater for the rear wheels, a target wheel slip for the rear wheels may be set to be greater than for the front wheels.

When the driving force of the first driving unit or the driving force of the second driving unit, distributed based on the driving force distribution ratio, exceeds a limit driving force of the first driving unit or the second driving unit, the driving force redistribution unit may redistribute excess driving force of the first driving unit or the second driving unit exceeding the limit driving force to the first driving unit or the second driving unit that does not exceed the limit driving force, and the limit driving force may be a maximum driving force generated by the first driving unit or the second driving unit.

The driving force redistribution unit may be configured to determine a reduction ratio of the excess driving force based on a turning index, and may redistribute a driving force that reduces the excess driving force using the reduction ratio to the first driving unit or the second driving unit that does not exceed the limit driving force.

According to an aspect of the present disclosure, a method of adjusting driving force includes receiving an input of a selection distribution ratio, which is a ratio of driving force generation of front wheels and rear wheels selected by a user; receiving driving information of a vehicle; determining a driving force distribution ratio, a driving force generation ratio of the front and rear wheels, and determining a driving force of the front and rear wheels using the driving force distribution ratio; and generating driving force to the front and rear wheels based on the driving force determined. In the determining of the driving force, the driving force distribution ratio is adjusted based on the driving information and the selection distribution ratio.

The driving information may include a driver's required torque, wheel slip information, vehicle's driving speed information, a steering angle, a friction coefficient of a road surface while driving, a yaw rate and yaw acceleration.

In the determining of the driving force, a first driving force distribution ratio in which the selection distribution ratio is reset within a preset initial setting range may be determined as the driving force distribution ratio, and the initial setting range may be a range set in consideration of a preset margin distribution ratio of the front or rear wheels.

In the determining of the driving force, a first additional distribution ratio may be determined in consideration of a friction coefficient of a road surface on which the vehicle is traveling and the selection distribution ratio, and the first additional distribution ratio may be additionally applied to the driving force distribution ratio.

The determining of the driving force may be performed by additionally applying a second additional distribution ratio determined differently depending on occurrence of understeer or oversteer of the vehicle.

The method of adjusting driving force may further include, when a driving force exceeding a magnitude of wheel slip occurring in the vehicle or a limit driving force of the front or rear wheels is required, redistributing the driving force to the front wheels and the rear wheels by adjusting the driving force of the front wheels and the driving force of the rear wheels distributed based on the driving force distribution ratio.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

BRIEF DESCRIPTION OF DRAWINGS

FIG. 5A and FIG. 5B are a diagram illustrating driving force control of a vehicle in an oversteer or understeer state according to an exemplary embodiment of the present disclosure.

Figure 1:
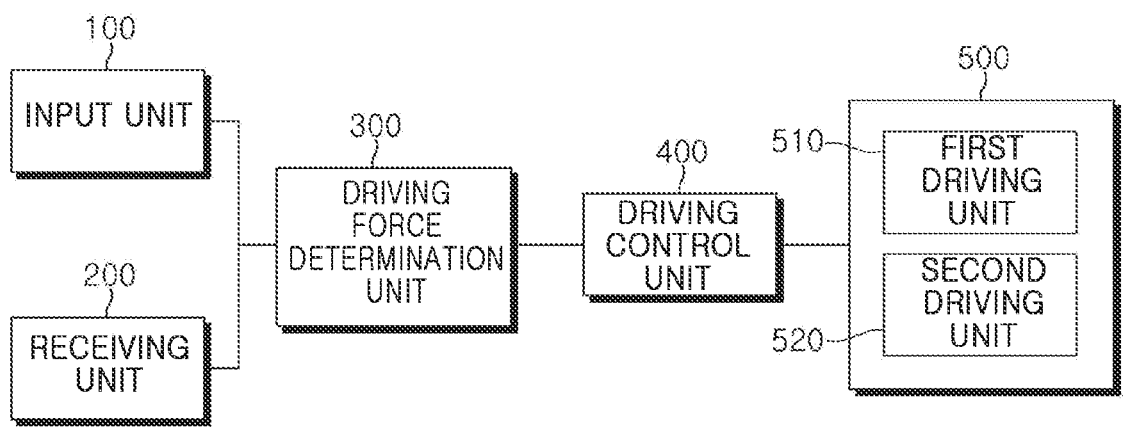
FIG. 1 is a block diagram of a driving force adjusting device according to an exemplary embodiment of the present disclosure.

It may be understood that the appended drawings are not necessarily to scale, presenting a somewhat simplified representation of various features illustrative of the basic principles of the present disclosure. The predetermined design features of the present disclosure as included herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Because the present disclosure may have various changes and may have various exemplary embodiments of the present disclosure, specific embodiments are illustrated in the drawings and described in detail. However, this is not intended to limit the present disclosure to a specific embodiment, and it should be understood to include all modifications, equivalents and substitutes included in the spirit and scope of the present disclosure.

Terms such as first, second, etc. may be used to describe various elements, but the elements should not be limited by the terms. The above terms are used only for distinguishing one component from another. For example, without departing from the scope of the present disclosure, a first component may be referred to as a second component, and similarly, a second component may also be referred to as a first component. The term "and/or" includes a combination of a plurality of related listed items or any of a plurality of related listed items.

The terms used in the present application are only used to describe specific embodiments, and are not intended to limit the present disclosure. The singular expression includes the plural expression unless the context clearly dictates otherwise. In the present application, terms such as "comprise" or "have" are intended to designate that a feature, number, step, operation, component, part, or combination thereof described in the specification exists, but it should be understood that it does not preclude the possibility of the presence or addition of one or more other features, numbers, steps, operations, components, parts, or combinations thereof.

Unless defined otherwise, all terms used herein, including technical or scientific terms, include the same meaning as commonly understood by one of ordinary skill in the art to which an exemplary embodiment of the present disclosure belongs. Terms such as those defined in a commonly used dictionary should be interpreted as including a meaning consistent with the meaning in the context of the related art, and should not be interpreted in an ideal or excessively formal manner unless explicitly defined in the present application.

Hereinafter, with reference to the accompanying drawings, an exemplary embodiment will be described in more detail.

Figure 2:
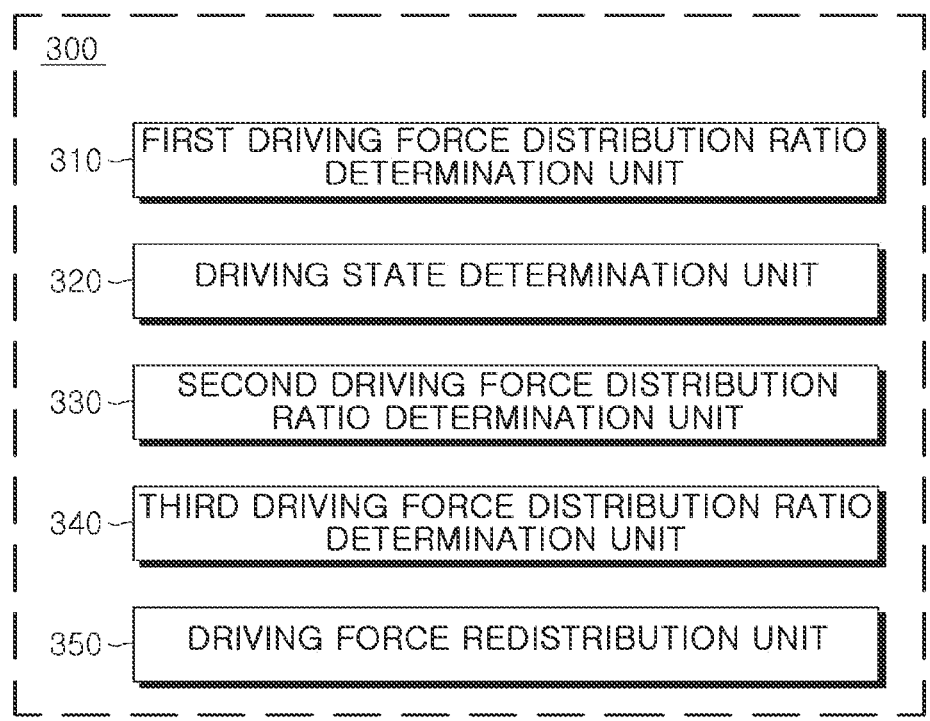
FIG. 2 is a detailed block diagram of a driving force determination unit according to an exemplary embodiment of the present disclosure.

FIG. 1 is a block diagram of a driving force adjusting device according to an exemplary embodiment of the present disclosure, and FIG. 2 is a detailed block diagram of a driving force determination unit 300 according to an exemplary embodiment of the present disclosure.

The driving force adjusting device according to an exemplary embodiment adjusts the driving force of the front and rear wheels of the vehicle, allowing the user to maximize the feeling of front-wheel driving and rear-wheel driving based on the drive ratio selected by the user, while ensuring driving stability of the vehicle.

In detail, in cases in which understeer, oversteer, or wheel slip occur during turning, the driving force adjusting device according to various exemplary embodiments of the present disclosure may be configured for controlling the stance of the vehicle while maintaining the driving feel of front-wheel driving and rear-wheel driving as much as possible based on the drive ratio selected by the user.

Referring to FIG. 1, the driving force adjusting device according to various exemplary embodiments of the present disclosure may include an input unit 100, a receiving unit 200, a driving force determination unit 300, a driving control unit 400, and a driving unit 500.

The input unit 100 may input the ratio of driving force generated from the front and rear wheels requested by the user. The input unit 100 may be a display (e.g., Audio, Video, Navigation (AVN)) capable of touch recognition included in the vehicle's control cluster, and the user may receive the ratio of the driving force generated from the front and rear wheels required by the user through touch.

Furthermore, the input unit 100 may receive input using voice. The input unit 100 includes audio and a microphone in the vehicle, and may recognize the user's voice and receive input of the ratio of driving force generated by the front and rear wheels.

The input unit 100 may not be limited to the display, audio, and microphone described above as long as it is a means of receiving a user's request for the ratio of driving force generated by the front and rear wheels.

The user may input the required ratio of driving force generated by the front and rear wheels through the input unit 100. For example, the user may input the ratio of driving force generated by the front and rear wheels as a value between 0:100 and 100:0 through the input unit 100.

Alternatively, the user may manipulate the input unit 100 to adjust the magnitude between 0:100 and 100:0 by a preset magnitude. For example, the user utilizes the plus and minus input buttons displayed on the input unit 100 to input the required ratio of the driving force generated by the front and rear wheels by adding or subtracting a preset size (e.g., 5 or 10, etc.).

The receiving unit 200 may receive information related to the driving state of the vehicle. For example, the receiving unit 200 may receive information related to the driving state including driver's required torque, wheel slip information, vehicle's driving speed information, steering angle, friction coefficient of the road surface while driving, a yaw rate, yaw acceleration, and the like.

However, the present disclosure is not limited thereto, and the receiving unit 200 may also receive driving information which may estimate the driver's required torque, wheel slip information, vehicle's driving speed information, steering angle, friction coefficient of the road surface on which it is driving, yaw rate, and yaw acceleration.

For example, the receiving unit 200 may further include driving information such as stroke size information of the vehicle's accelerator pedal, wheel speed of each wheel, vehicle traveling speed information, and the like. In the instant case, the driver's required torque may be estimated through information on the stroke size of the accelerator pedal, and wheel slip may also be estimated through the speed difference between the wheel speed of each wheel and the vehicle's driving speed.

The receiving unit 200 may be operatively connected to sensors provided in the vehicle using a network provided in the vehicle and receive information related to the driving state of the vehicle. For example, the receiving unit 200 may receive brake pedal stroke information from an accelerator pedal sensor using the vehicle's Controller Area Network (CAN).

The driving force determination unit 300 may be configured to determine the driving force distribution ratio according to the user's settings and the driving state of the vehicle. The driving force determination unit 300 may be configured to determine the driving force of the front and rear wheels by applying the determined driving force distribution ratio to the required driving force transmitted by the user's operation of the accelerator pedal.

The driving control unit 400 may be configured for controlling the driving unit 500 to generate driving force to the vehicle according to the driving force determined by the driving force determination unit 300.

In the instant case, the driving unit 500 may be a device configured for generating a driving force that allows the vehicle to drive. There may be at least two driving units 500, and the driving force of the front wheels and the driving force of the rear wheels may be generated differently.

The driving unit 500 may include a first driving unit 510 generating driving force to the front wheels and a second driving unit 520 generating driving force to the rear wheels. However, the present disclosure is not limited thereto, and the first driving unit 510 may be configured to generate driving force to the rear wheels, and the second driving unit 520 may be configured to generate driving force to the front wheels.

The first driving unit 510 and the second driving unit 520 may include at least one electric motor or engine and separately generate driving force to the front and rear wheels.

Furthermore, the first driving unit 510 and the second driving unit 520 may be combined in various manners to generate driving force to the vehicle. For example, the first driving unit 510 and the second driving unit 520 may both include electric motors or both may include engines. Alternatively, one driving unit 500 of the first driving unit 510 and the second driving unit 520 may include an electric motor, and the other driving unit 500 may include an engine.

Furthermore, the first driving unit 510 and the second driving unit 520 may be in-wheel motors that are mounted on individual wheels and generate driving force, without being limited thereto, and the driving unit 500 may be implemented with various means configured for generating driving force for the vehicle.

The components of the driving force adjusting device may be connected wired and wirelessly to exchange information, and for example, exchange data using communication methods such as Ethernet, Media Oriented Systems Transport (MOST), Flexray, Controller Area Network (CAN), Local Interconnect Network (LIN), Internet, LTE, 5G, Wi-Fi, Bluetooth, Near Field Communication (NFC), Zigbee, Radio Frequency (RF), and the like.

Referring to FIG. 2, the driving force determination unit 300 may include a first driving force distribution ratio determination unit 310, a driving state determination unit 320, a second driving force distribution ratio determination unit 330, a third driving force distribution ratio determination unit 340, and a driving force redistribution unit 350.

The first driving force distribution ratio determination unit 310 may be configured to determine the first driving force distribution ratio based on the driving force distribution ratio input by the user. In the instant case, the driving force distribution ratio input by the user through the input unit 100 may be referred to as the selection distribution ratio.

According to an exemplary embodiment of the present disclosure, each of the driving force determination unit 300, and the driving control unit 400 may be implemented by a processor (e.g., computer, microprocessor, CPU, ASIC, circuitry, logic circuits, etc.). Alternatively, the driving force determination unit 300, and the driving control unit 400 may be integrated in a single processor. According to an exemplary embodiment of the present disclosure, the driving force determination unit 300, and the driving control unit 400 may be implemented by software.

Figure 4:
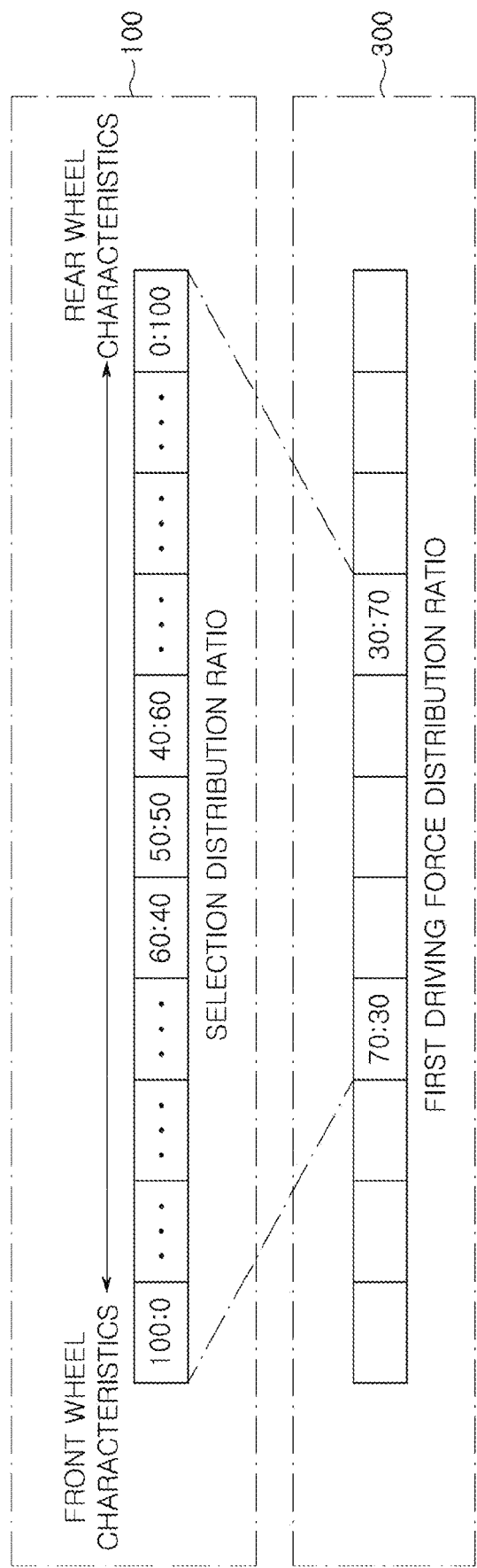
FIG. 4 is a diagram illustrating a selection distribution ratio and a first driving force distribution ratio according to an exemplary embodiment of the present disclosure.

FIG. 4 is a diagram illustrating a selection distribution ratio and a first driving force distribution ratio according to an exemplary embodiment of the present disclosure by way of example, and FIG. 5 is a diagram illustrating the driving force control of the vehicle in oversteer or understeer state according to an exemplary embodiment of the present disclosure.

First, with reference to FIG. 5A and FIG. 5B, in the case in which understeer (see FIG. 5A) or oversteer (see FIG. 5B) occurs during turning driving, the process of controlling the vehicle's stance by adjusting the vehicle's driving force is described.

As illustrated in FIG. 5A, understeer may be a state in which the vehicle deviates from the target path according to the vehicle's driving speed and steering angle, and the actual path may be a state in which the vehicle travels with a greater curvature than the target path.

In the instant case, because the friction force acting on the front wheels occurs in a saturated state outside of the friction source, it may be necessary to transfer a portion of the driving force from the front wheels to the rear wheels to escape from the understeer state.

For example, to overcome understeer, the driving force distribution ratio may need to be adjusted to distribute a relatively larger driving force to the rear wheels compared to the driving force distribution ratio when understeer occurs. In the instant case, the distribution of greater driving force to the rear wheels compared to the driving force distribution ratio when understeer occurs may be referred to as driving force to the rear-wheels.

Furthermore, as illustrated in FIG. 5B, oversteer may be a state in which the vehicle deviates from the target path according to the vehicle's driving speed and steering angle, and the actual path may be a state in which the vehicle travels with a smaller curvature than the target path.

In the instant case, because the friction force acting on the rear wheels occurs in a saturated state outside the friction source, it may be necessary to transfer a portion of the driving force from the rear wheels to the front wheels to escape from the oversteer state.

For example, to overcome oversteer, the driving force distribution ratio may need to be adjusted to distribute a relatively larger driving force to the front wheels compared to the driving force distribution ratio when oversteer occurs. In the instant case, the distribution of greater driving force to the front wheels compared to the driving force distribution ratio when oversteer occurs may be referred to as driving force to the front wheels.

Referring again to FIG. 4, the user may input the selection distribution ratio through the input unit 100. Referring to the input unit 100 illustratively illustrated in FIG. 4, the input unit 100 includes 11 boxes that change the ratio of rear-wheel driving force to front-wheel driving force at a rate of 10 percent from 100:0 to 0:100. Furthermore, the user may select one of 11 boxes displayed on the input unit 100 and enter the selection distribution ratio.

On the other hand, the degree of adjusting the selective distribution ratio is not limited to 10 percent, and the ratio of rear-wheel driving force to front-wheel driving force may be changed in 5 percent or 1 percent increments or continuously, from 100:0 to 0:100.

Furthermore, the means by which the user inputs the selected distribution ratio is not limited to selection on the display, and various input means such as manipulating a dial button or inputting through voice may be applied.

On the other hand, if the driving force distribution ratio of the vehicle is determined by directly applying the distribution ratio as it is, selected by the user, problems may occur in the driving stability of the vehicle.

The user may set the selection distribution ratio by selecting a higher ratio for either the front or rear wheels. For example, the user may select the selection distribution ratio of rear-wheel driving force to front-wheel driving force as 100:0 or 0:100. In the instant case, if understeer or oversteer occurs in the vehicle, because it is not possible to change the driving force to the rear wheels or to the front wheels, it may be difficult to overcome understeer or oversteer conditions.

Accordingly, the first driving force distribution ratio determination unit 310 may be configured to determine the first driving force distribution ratio by adjusting the selection distribution ratio to the initial setting range.

In the instant case, the initial setting range may be a range that limits the selection distribution ratio to ensure sufficient driving force for the front and rear wheels.

For example, with reference to FIG. 4, the initial setting range may be set to 70:30 to 30:70 in rear-wheel driving force to front-wheel driving force, and the driving force distribution ratio may secure at least 30 percent of margin in the front or rear wheel direction regardless of the selection distribution ratio.

On the other hand, the initial setting range may be set in various manners depending on the type of vehicle.

The driving state determination unit 320 may be configured to determine the driving state of the vehicle. In the instant case, the driving state of the vehicle may include whether the vehicle is turning, occurrence of understeer, occurrence of oversteer, occurrence of wheel slip, and the like.

The driving state determination unit 320 may be configured to determine whether the vehicle is turning. The driving state determination unit 320 may estimate a turning index that shows the degree of curvature of the path on which the vehicle is turning.

In the instant case, the turning index may be estimated using the vehicle's steering angle, yaw rate, and yaw acceleration. Furthermore, the larger the turning index, the greater the curvature of the turning path, and the smaller the turning index, the closer the turning path may be to a straight line.

Furthermore, the driving state determination unit 320 may be configured to determine whether understeer or oversteer has occurred in a vehicle which is turning.

In the instant case, the oversteer state may be a state in which the turning radius becomes smaller than the angle at which the steering wheel is turned while the vehicle is turning. Furthermore, the understeer state may be a state in which the turning radius becomes greater than the angle at which the steering wheel is turned while the vehicle is turning.

The driving state determination unit 320 of the vehicle may estimate an understeer index (US Index) or an oversteer index (OS Index) along with whether understeer or oversteer occurs. In the instant case, the understeer index (US Index) may be an index illustrating the degree of understeer occurring in the vehicle. The oversteer index (OS Index) may be an index illustrating information related to oversteer that has occurred in the vehicle.

The driving state determination unit 320 may be configured to determine a target yaw rate using the vehicle's driving speed and steering angle, and determine a yaw rate error amount which is the difference between the target yaw rate and the current y aw rate. The driving state determination unit 320 may be configured to determine an understeer index (US Index) or an oversteer index (OS Index) by combining the estimated lateral slip angle of the vehicle and the yaw rate error amount.

The second driving force distribution ratio determination unit 330 may be configured to determine a second driving force distribution ratio that considers the first additional distribution ratio determined based on the friction coefficient of the road surface on which the vehicle is traveling.

When the vehicle is traveling in a straight line, the user may hardly feel the driving force distribution ratio of the vehicle. The section in which the user feels a significant difference in the vehicle's driving force distribution ratio may be a section during turning driving, especially a limit driving section in which understeer or oversteer occurs.

In the driving force adjusting device according to an exemplary embodiment of the present disclosure, when entering a turning drive, a first additional distribution ratio is applied, and when driving at a limit turning, a second additional distribution ratio is additionally applied, ensuring the driving stability of the vehicle and maximizing the riding comfort according to the distribution ratio selected by the user.

When the vehicle turns and drives, the second driving force distribution ratio determination unit 330 may be configured to determine the first additional distribution ratio based on the friction coefficient of the road surface.

Figure 6:
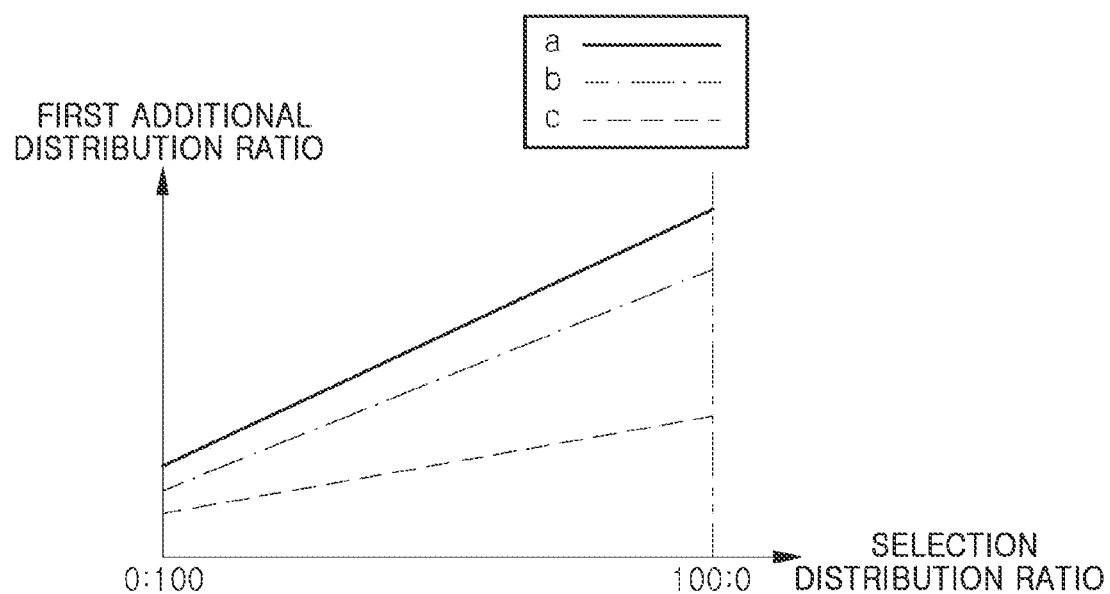
FIG. 6 is a graph of a first additional distribution ratio according to an exemplary embodiment of the present disclosure.

FIG. 6 is a graph of the first additional distribution ratio according to an exemplary embodiment of the present disclosure. In the instant case, line a is a diagram for a high friction road surface where the friction coefficient of the road surface on which the vehicle is driving is greater than a preset friction coefficient, and line c is a diagram for a low friction road surface where the friction coefficient of the road surface on which the vehicle is driving is less than the preset friction coefficient. Furthermore, line b may be a diagram for any road surface between a high-friction road surface and a low-friction road surface.

Referring to FIG. 6, the first additional distribution ratio may be determined based on the user's selection distribution ratio. The first additional distribution ratio may be determined in proportion to the drive ratio distributed to the front wheels. The first additional distribution ratio may increase or decrease in the same trend as the drive ratio distributed to the front wheels increases or decreases.

In the instant case, according to the exemplary embodiment of FIG. 6, the first additional distribution ratio increases linearly in proportion to the user's selection distribution ratio, but the present disclosure is not limited thereto, and the first additional distribution ratio increases or decreases non-linearly in response to the increase or decrease in the user's selection distribution ratio.

Furthermore, in the case in which the same selection distribution ratio is set, the first additional distribution ratio when driving on a high-friction road surface may be greater than the first additional distribution ratio when driving on a low-friction road surface.

In the instant case, the high-friction road surface may be a road surface in which the friction coefficient of the road surface on which the vehicle is running is greater than a preset friction coefficient, and in the case of a high-friction road surface, the same first additional distribution ratio may be applied regardless of the friction coefficient.

Furthermore, a low-friction road surface may be a road surface in which the friction coefficient of the road surface on which the vehicle is running is smaller than a preset friction coefficient, and in the case of the low-friction road surface, the same first additional distribution ratio may be applied regardless of the friction coefficient.

Furthermore, in cases in which the friction coefficient of the road surface on which the vehicle is running is between a high-friction road surface and a low-friction road surface, the first additional distribution ratio may be estimated and applied using an interpolation method or the like based on the first additional distribution ratio of the high-friction road surface and the first additional distribution ratio of the low-friction road surface.

The second driving force distribution ratio determination unit 330 may be configured to determine the second driving force distribution ratio by considering the first additional distribution ratio in the first driving force distribution ratio.

In cases in which understeer or oversteer occurs in a vehicle which is turning, the vehicle's driving force distribution ratio may need to be additionally adjusted to ensure driving stability.

The third driving force distribution ratio determination unit 340 may be configured to determine the third driving force distribution ratio in consideration of the second additional distribution ratio determined based on whether understeer or oversteer occurs, in the second driving force distribution ratio. In the instant case, the third driving force distribution ratio determination unit 340 may receive the driving state of the vehicle (for example, occurrence of understeer or oversteer, or the like) from the driving state determination unit 320.

The third driving force distribution ratio determination unit 340 may set the second additional distribution ratio differently when understeer occurs and when oversteer occurs.

Figure 7:
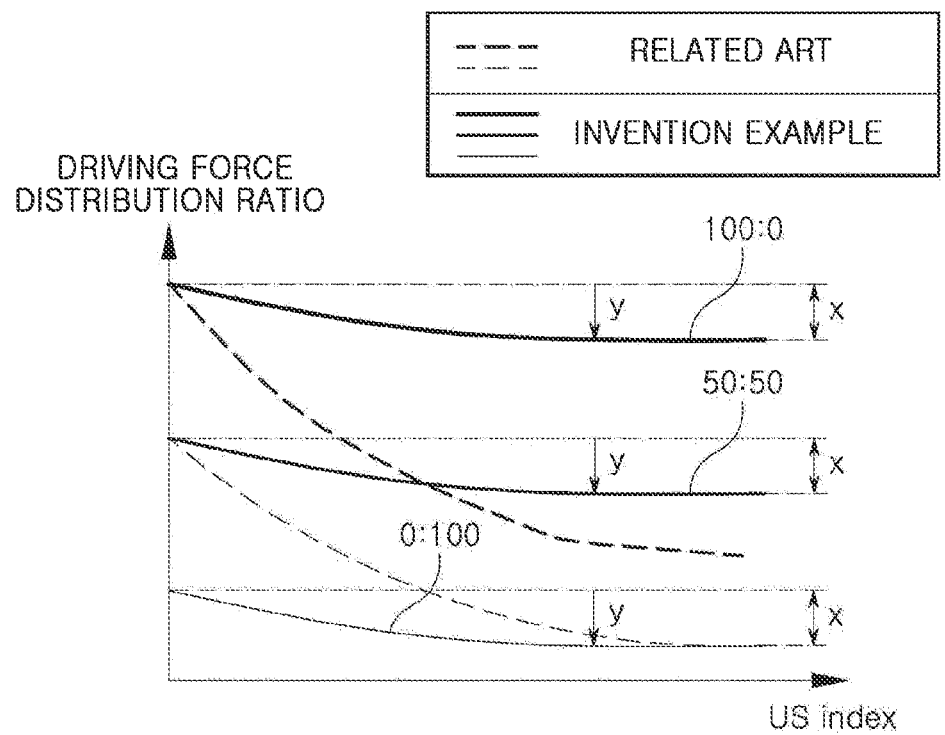
FIG. 7 is a graph illustrating a second additional distribution ratio according to an exemplary embodiment when understeer occurs, by way of example.
Figure 8:
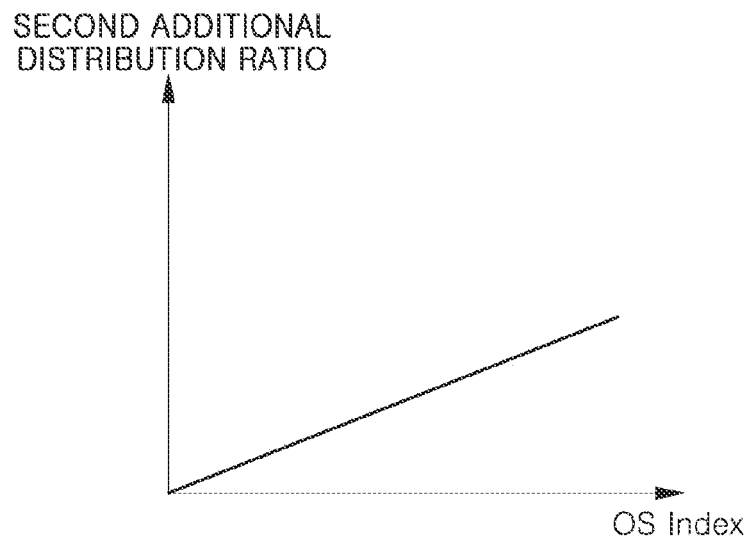
FIG. 8 is a graph illustrating a second additional distribution ratio according to an exemplary embodiment when oversteer occurs, by way of example.
Figure 9:
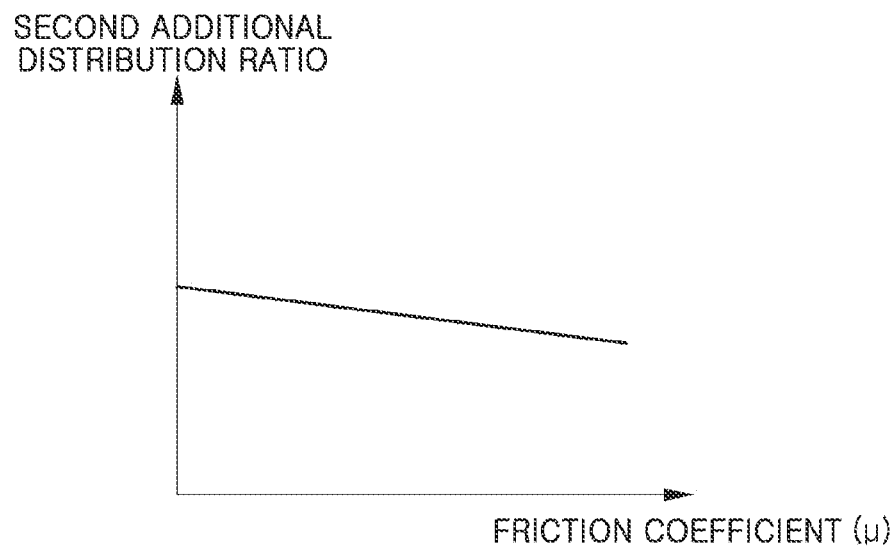
FIG. 9 is a graph illustrating a second additional distribution ratio according to an exemplary embodiment when oversteer occurs, by way of example.
Figure 10:
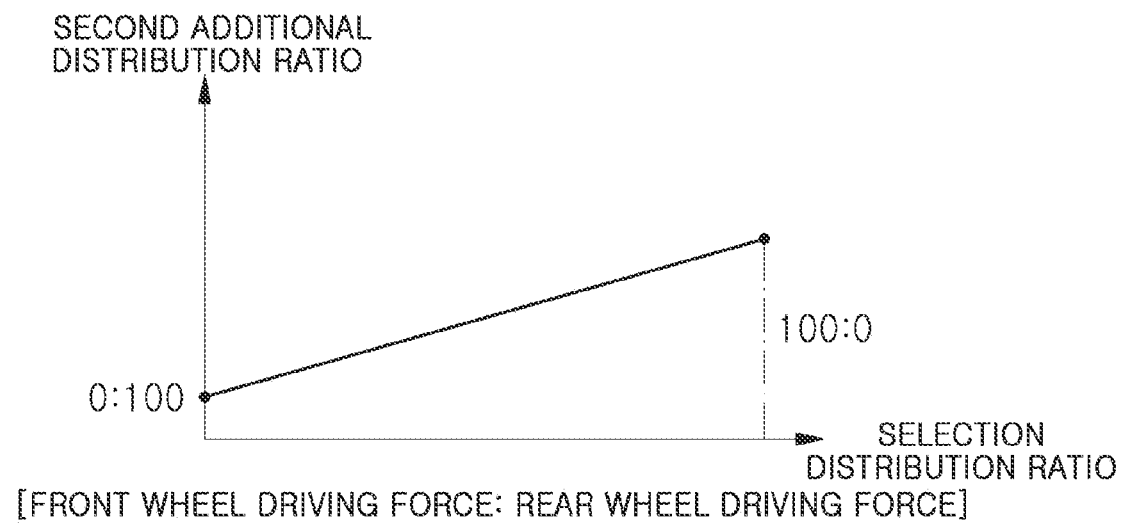
FIG. 10 is a graph illustrating a second additional distribution ratio according to an exemplary embodiment when oversteer occurs, by way of example.

FIG. 7 is a graph illustrating a second additional distribution ratio according to an exemplary embodiment in the case in which understeer occurs, by way of example, and FIG. 8 is a graph illustrating the second additional distribution ratio according to an exemplary embodiment in the case in which oversteer occurs, by way of example. FIG. 9 is a graph illustrating the second additional distribution ratio according to an exemplary embodiment in the case in which oversteer occurs, by way of example, and FIG. 10 is a graph illustrating the second additional distribution ratio according to an exemplary embodiment in the case in which oversteer occurs, by way of example.

Referring to FIG. 7, when understeer occurs in a vehicle, the third driving force distribution ratio determination unit 340 according to various exemplary embodiments of the present disclosure may adjust the driving force distribution ratio.

In the instant case, the US Index may be an understeer index (US Index), x may be the marginal additional distribution ratio, and y may represent the second additional distribution ratio in any US Index.

In the case in which understeer occurs in the vehicle, the third driving force distribution ratio determination unit 340 may reduce the driving force distribution ratio of the front wheels based on the degree of understeer, and may increase the driving force distribution ratio of the rear wheels.

In the instant case, the third driving force distribution ratio determination unit 340 may estimate the degree of occurrence of understeer based on the understeer index (US Index).

In the case in which understeer occurs in a vehicle, the friction force of the front wheels exceeds the friction coefficient, and the understeer may be resolved by transmitting the driving force of the front wheels to the rear wheels.

On the other hand, in the case in which the driving force distribution ratio of the vehicle is rear-wheeled without limitation to overcome understeer of the vehicle as in the related art of FIG. 7, it is difficult to feel the ride comfort according to the selection distribution ratio selected by the user, and if understeer is severe, it may cause the user to feel a ride which is opposite to the selection distribution ratio selected by the user.

For example, when the user selects front-wheel driving (e.g., driving force distribution ratio of rear wheels to front wheels, 100:0) as the selection distribution ratio, understeer is severe and thus, when the second additional distribution ratio is set to 100 percent, the driving force distribution ratio of the vehicle may be changed to a driving force distribution ratio (for example, a driving force distribution ratio of rear wheels to front wheels, 0:100) opposite to the selection distribution ratio selected by the user.

To resolve the above-mentioned problem, the third driving force distribution ratio may be limited to change the second additional distribution ratio within the marginal additional distribution ratio when understeer occurs.

Referring to FIG. 7, the size (y) of the second additional distribution ratio may increase as the understeer index (US Index) increases. The size (y) of the second additional distribution ratio may change based on the understeer index (US Index), regardless of the magnitude of the driving force distribution ratio. However, the size (y) of the second additional distribution ratio cannot be greater than the marginal additional distribution ratio (x).

In the case in which understeer occurs, the third driving force distribution ratio determination unit 340 may shift the driving force to the rear wheels by the size (y) of the second additional distribution ratio.

For example, the marginal additional distribution ratio (x) may be preset to 10 percent. In the case in which understeer occurs, the third driving force distribution ratio may shift the driving force to the rear wheels by an amount (y) of the second additional distribution ratio. In the instant case, the second additional distribution ratio may vary depending on the understeer index (US Index), but may not exceed 10 percent, the marginal additional distribution ratio (x).

Referring to FIG. 8, FIG. 9 and FIG. 10, when oversteer occurs in the vehicle, the third driving force distribution ratio determination unit 340 according to various exemplary embodiments of the present disclosure may adjust the driving force distribution ratio.

In the instant case, the OS Index may be an oversteer index (OS Index), and the oversteer index (OS Index) may be an index indicating the degree of oversteer that occurs in the vehicle.

When oversteer occurs in the vehicle, the third driving force distribution ratio determination unit 340 reduces the driving force distribution ratio of the rear wheels based on the degree of oversteer, and may increase the driving force distribution ratio of the front wheels.

In detail, the third driving force distribution ratio determination unit 340 may promote driving force to the front wheels to eliminate oversteer of the vehicle.

The third driving force distribution ratio determination unit 340 may estimate the second additional distribution ratio based on the understeer index (US Index). The third driving force distribution ratio determination unit 340 may be configured to determine at least one additional distribution ratio based on the understeer index (US Index), and determine the sum of the at least one additional distribution ratio as the second additional distribution ratio.

Referring to FIG. 8, in the case in which oversteer occurs, the third driving force distribution ratio determination unit 340 may be configured to determine a second additional distribution ratio based on the oversteer index (OS Index). In the instant case, the second additional distribution ratio may increase linearly in proportion to the oversteer index (OS Index). However, the present disclosure is not limited thereto, and the second additional distribution ratio may increase or decrease non-linearly based on the oversteer index (OS Index), or increase or decrease based on various functions.

Furthermore, referring to FIG. 9, in the case in which oversteer occurs, the third driving force distribution ratio determination unit 340 may be configured to determine a second additional distribution ratio based on the friction coefficient of the road surface on which the vehicle is traveling.

In the instant case, the second additional distribution ratio may decrease in linear proportion as the friction coefficient increases. However, the present disclosure is not limited thereto, and the second additional distribution ratio may increase or decrease non-linearly in a trend opposite to the friction coefficient, or may increase or decrease based on various functions.

Furthermore, referring to FIG. 10, when oversteer occurs, the third driving force distribution ratio determination unit 340 may be configured to determine a second additional distribution ratio based on the selection distribution ratio selected by the driver.

In the instant case, the second additional distribution ratio may increase linearly in proportion to the ratio of the driving force of the front wheels. In more detail, the second additional distribution ratio may decrease as the ratio of the driving force of the rear wheels increases, and may increase as the ratio of the driving force of the front wheels increases.

However, the present disclosure is not limited thereto, and the second additional distribution ratio may increase or decrease non-linearly based on the ratio of the driving force of the front wheels or the ratio of the driving force of the rear wheels, or may increase or decrease based on various functions.

Furthermore, in the case in which oversteer occurs, the third driving force distribution ratio determination unit 340 may be configured to determine a second additional distribution ratio based on the oversteer index (OS Index), the friction coefficient of the road surface on which the vehicle is travelling, or the selection distribution ratio.

For example, in the case in which oversteer occurs, the third driving force distribution ratio determination unit 340 may determine, as the second additional distribution ratio, at least one of the distribution ratios determined based on the oversteer index (OS Index), the friction coefficient of the road surface while travelling, or the selection distribution ratio.

Furthermore, the third driving force distribution ratio determination unit 340 may be configured to determine the second additional distribution ratio by adding up at least two of the additional distribution ratios determined based on the oversteer index (OS Index), the friction coefficient of the road surface while driving, or the selection distribution ratio.

When oversteer occurs in a vehicle, the friction force of the rear wheels exceeds the friction coefficient, and oversteer may be resolved by transferring the driving force from the rear wheels to the front wheels.

On the other hand, in the case of changing the driving ratio of the vehicle to the front wheels without limitation, it is difficult to feel the riding comfort according to the selection distribution ratio selected by the user. In severe cases of oversteer, it may cause the user to feel a ride which is opposite to the selection distribution ratio selected by the user.

Accordingly, the third driving force distribution ratio determination unit 340 may be configured to determine the second excess distribution ratio within the marginal additional distribution ratio, even when oversteer occurs, similarly to the case in which understeer occurs.

Accordingly, the third driving force distribution ratio determination unit 340 may adjust a maximum value of each additional distribution ratio determined based on the oversteer index (OS Index), the friction coefficient of the road surface on which the vehicle is traveling, or the selection distribution ratio, depending on the number of factors that determine the second additional distribution ratio when oversteer occurs.

Alternatively, the third driving force distribution ratio determination unit 340 is configured to determine the second additional distribution ratio with the sum of the additional distribution ratios determined by a plurality of factors, but in the case in which the degree of the second additional distribution ratio exceeds the marginal additional distribution ratio, the third driving force distribution ratio determination unit 340 may be configured to determine the second additional distribution ratio as being the marginal additional distribution ratio.

The driving force determination unit 300 applies the driving force distribution ratio determined by the first, second, and third driving force distribution ratio determination units 340 to the required driving force transmitted by the user's operation of the accelerator pedal so that the driving force of the front wheels and the driving force of the rear wheels may be determined respectively.

The driving force redistribution unit 350 may redistribute the driving force of the front wheels and the driving force of the rear wheels determined according to the driving force distribution ratio.

The driving force redistribution unit 350 may redistribute the front wheel driving force and the rear wheel driving force to ensure driving stability of the vehicle when excessive wheel slip occurs on the front or rear wheels of the vehicle. In the instant case, the case in which excessive wheel slip occurs may be a case in which wheel slip exceeding the allowable wheel slip occurs.

In more detail, when wheel slip exceeding the allowable wheel slip occurs on the front or rear wheels of the vehicle, the driving force redistribution unit 350 may transfer and redistribute a portion of the driving force of one of the front or rear wheels in which wheel slip exceeding the allowable wheel slip has occurred, to the other of the front or rear wheels.

For driving stability, the driving state determination unit 320 may estimate and monitor wheel slip of the front or rear wheels periodically or in real time.

In more detail, the driving state determination unit 320 may be configured to determine whether wheel slip exceeding the allowable wheel slip has occurred in the vehicle, based on the wheel slip error.

In the instant case, the wheel slip error is a value determined through the difference between the current wheel slip and the target wheel slip. In the case in which the wheel slip error is greater than the preset allowable wheel slip value, it is determined that wheel slip exceeding the allowable wheel slip has occurred.

In the instant case, the target wheel slip may be wheel slip required for the vehicle to drive on the target path. Referring again to FIG. 5A and FIG. 5B, when the vehicle turns to the target path, wheel slip inevitably occurs in the vehicle, although it may vary depending on the radius of the target path.

In wheel slip occurring in a turning vehicle, the target wheel slip may be the wheel slip required to drive the target path, and when the difference between the wheel slip occurring in the vehicle and the target wheel slip is a predetermined difference or more, it may be determined that there is a problem with the vehicle's behavior because wheel slip exceeding the allowable wheel slip occurs.

Therefore, the driving state determination unit 320 compares the wheel slip error, the difference between the current wheel slip and the target wheel slip, with a preset allowable wheel slip, to determine whether wheel slip exceeding the allowable wheel slip occurs.

The driving state determination unit 320 may adjust the target wheel slip of the front and rear wheels according to the selection distribution ratio. The driving state determination unit 320 adjusts the target wheel slip to adjust the wheel slip error, so that even when the same wheel slip occurs, the determination of whether wheel slip exceeding the allowable wheel slip occurs may be different.

For example, when the user selects a selection distribution ratio so that the driving force distribution ratio is distributed to the front wheels to a greater extent, the driving state determination unit 320 may set the degree of target wheel slip of the front wheels to be greater than the target wheel slip of the rear wheels.

In detail, in cases in which the user wants to feel a greater driving force of the front wheels, by setting the target wheel slip of the front wheels to be greater, more wheel slip is allowed on the front wheels, allowing the user to feel a stronger riding sensation unique to front wheel drive.

Furthermore, when the user selects the selection distribution ratio to distribute the driving force distribution ratio more to the rear wheels, the driving state determination unit 320 may set the degree of the target wheel slip of the rear wheels to be greater than the target wheel slip of the front wheels.

In detail, in cases in which the user wants to feel greater driving force of the rear wheels, by setting the target wheel slip of the rear wheel to be greater, more wheel slip is allowed to the rear wheels, allowing the user to feel a stronger riding sensation unique to rear wheel drive.

Furthermore, the target wheel slip adjustment degree may be determined based on the selection distribution ratio.

For example, when the user selects a 50:50 distribution ratio of rear-wheel driving force to front-wheel driving force, the driving state determination unit 320 may set the target wheel slip of the front and rear wheels to be the same. Furthermore, as the user increases the driving force of the front or rear wheels, the target wheel slip of the front or rear wheels may be increased proportionally.

Figure 11:
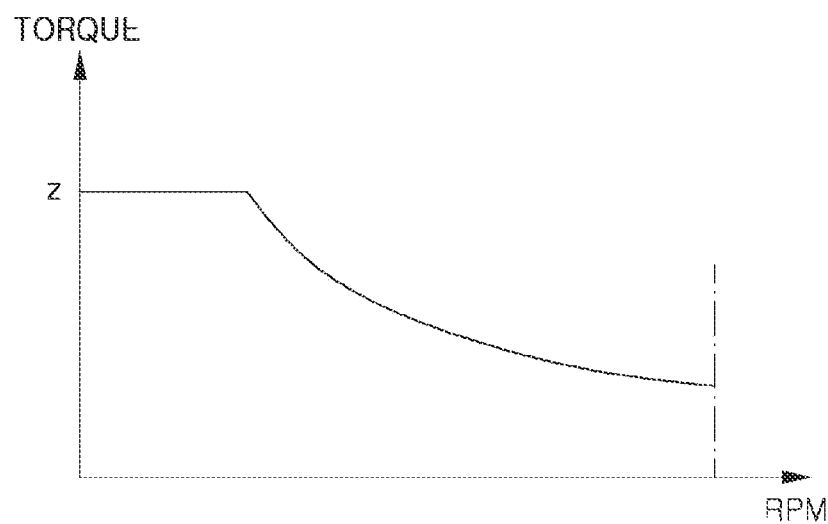
FIG. 11 is a graph illustrating a driving limit of a driving unit according to an exemplary embodiment of the present disclosure.

FIG. 11 is a graph illustrating the driving limit of the driving unit 500 according to an exemplary embodiment of the present disclosure.

Referring to FIG. 11, when the driving unit 500 includes an electric motor, it is difficult for the driving unit 500 to generate a maximum torque (z) or more. FIG. 11 illustrates an example of an electric motor, but even when the driving unit 500 is an engine, the driving unit 500 cannot generate driving force at a value of a maximum output or more of the engine.

In detail, the driving unit 500 includes a limit to the driving force which may be generated. In the instant case, the limit of the driving force which may be generated by the driving unit 500 may be referred to as the limit driving force.

When the driving force of the front wheels and the driving force of the rear wheels determined using the driving force distribution ratio determined by the first, second, and third driving force distribution ratio determination units 340 exceed the limit driving force of the driving unit 500, the driving force redistribution unit 350 may redistribute driving force.

The driving force redistribution unit 350 may redistribute the driving force by transmitting the driving force that exceeds the limit driving force among the driving force of the front wheels or the driving force of the rear wheels to the front wheels or rear wheels that do not exceed the limit driving force.

In the case in which the vehicle drives straight, redistributing the driving force of the vehicle may not include a significant impact on the user's riding comfort. On the other hand, when the vehicle is turning (in detail, when understeer or oversteer occurs), the redistribution of the vehicle's driving force may include a significant impact on the user's riding comfort.

Accordingly, the driving force redistribution unit 350 may use the turning index to determine the reduction ratio of the driving force exceeding the limit driving force, and transfer the driving force obtained by applying the determined reduction ratio to the driving force exceeding the limit driving force to the driving unit 500 that does not exceed the limit driving force.

In the instant case, the turning index may be estimated using the vehicle's steering angle, yaw rate, and yaw acceleration. Furthermore, the larger the turning index, the greater the curvature of the turning path, and the smaller the turning index, the closer the turning path may be to a straight line.

Furthermore, the reduction ratio may be determined in proportion to the turning index. The reduction ratio increases as the turning index increases, and may decrease as the turning index decreases. In detail, a high reduction ratio may be applied on a sharp curved route with a large turning index, and a low reduction ratio may be applied on a path close to a straight line with a relatively small turning index.

The driving force redistribution unit 350 may redistribute the driving force by multiplying the driving force exceeding the limit driving force by a reduction ratio and transmitting the reduced driving force to the driving force 500 that does not exceed the limit driving force.

Figure 3:
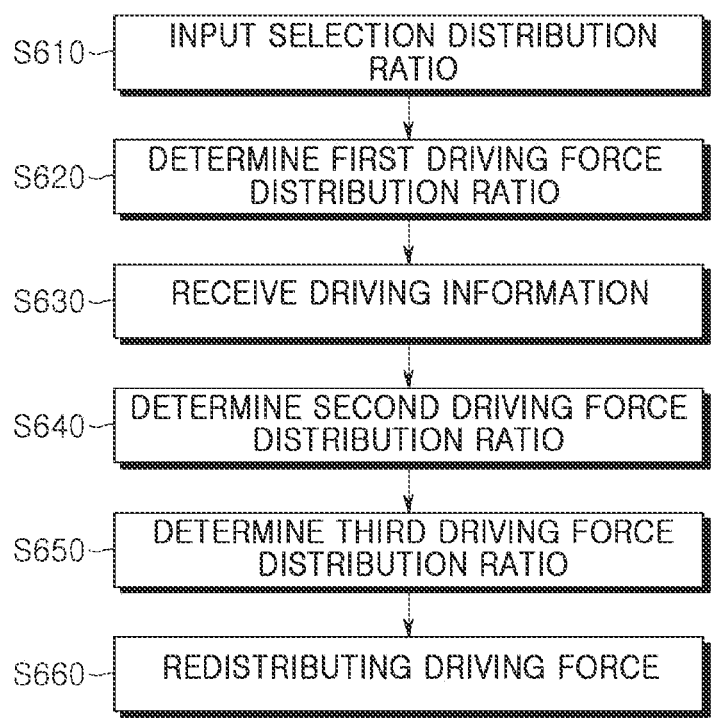
FIG. 3 is a block diagram of a method of adjusting driving force according to an exemplary embodiment of the present disclosure.

The driving force redistribution unit 350 utilizes a reduction ratio determined by the turning index to supplement a portion of the driving force that exceeds the limit driving force so that the user's required driving force may be met as much as possible, while the riding comfort according to the driving force distribution ratio set by the user may be maintained, FIG. 3 is a block diagram of a method of adjusting driving force according to an exemplary embodiment of the present disclosure.

Referring to FIG. 3, the method of adjusting driving force according to various exemplary embodiments of the present disclosure may include receiving input of a selection distribution ratio (S610), determining a first driving force distribution ratio (S620), receiving driving information (S630), determining a second driving force distribution ratio (S640), determining a third driving force distribution ratio (S650), and redistributing driving force (S660).

The operation of receiving the selection distribution ratio may be an operation of receiving an input of the selection distribution ratio selected by the user through the input unit 100 provided in the vehicle (S610).

The user may input the selection distribution ratio through the input unit 100 to feel the riding comfort required by the user. In the instant case, the user may input the distribution ratio of rear-wheel driving force to front-wheel driving force in the range from 0:100 to 100:0.

The operation of determining the first driving force distribution ratio may be an operation of adjusting the driving force distribution ratio to match the selection distribution ratio input by the user within a preset initial setting range (S620). In the instant case, the initial setting range is a range to secure the margin of the driving force distribution ratio in the front and rear wheels, and may be a range in which the margin of the driving force distribution ratio is set in the front and rear wheels and excluded, respectively.

For example, when the margin range is set to 30 percent, the initial setting range may be set to a range of 70:30 to 30:70 of the distribution ratio of rear wheel driving force to front wheel driving force, excluding 30 percent of the front wheels and 30 percent of the rear wheels.

The operation of determining the first driving force distribution ratio may be an operation of determining the first driving force distribution ratio obtained by matching the selection distribution ratio to the initial setting range.

The operation of receiving driving information may be an operation of receiving driving information of the vehicle while driving according to the first driving force distribution ratio(S630).

In the instant case, the driving information may include the driver's required torque, wheel slip information, vehicle's driving speed information, steering angle, friction coefficient of the road surface on which the vehicle is driving, yaw rate, yaw acceleration, and the like.

The operation of determining the second driving force distribution ratio may be an operation of determining the second driving force distribution ratio in which the first additional distribution ratio determined according to the friction coefficient of the road surface on which the vehicle is traveling and the selection distribution ratio is applied to the first driving force distribution ratio(S640).

The operation of determining the third driving force distribution ratio may be an operation of determining a third driving force distribution ratio in which a second additional distribution ratio determined depending on understeer or oversteer of the vehicle is applied to the second driving force distribution ratio(S650).

In the method of adjusting driving force according to an exemplary embodiment of the present disclosure, in the case of entering a turning drive, a first additional distribution ratio may be applied, and additionally a second additional distribution ratio may be applied when driving at a limit turning, ensuring the driving stability of the vehicle and maximizing the riding comfort according to the selection distribution ratio selected by the user.

In the instant case, the second additional distribution ratio may be determined in different manners in cases in which understeer and oversteer occur.

For example, when understeer occurs, the second additional distribution ratio may be determined in proportion to the understeer index (US Index), and the second additional distribution ratio cannot exceed the marginal additional distribution ratio.

For example, when oversteer occurs, the second additional distribution ratio may be determined based on the oversteer index (OS Index), the friction coefficient of the road surface on which the vehicle is traveling, or the selection distribution ratio. Even when oversteer occurs, as with understeer, it may be desirable that the second additional distribution ratio does not exceed the marginal additional distribution ratio.

The operation of redistributing the driving force may be an operation of redistributing the driving force of the front wheels and the driving force of the rear wheels determined according to the driving force distribution ratio(S660).

In the operation of redistributing the driving force, the driving force redistribution unit 350 may redistribute the front wheel driving force and the rear wheel driving force for the driving stability of the vehicle when wheel slip exceeding the allowable wheel slip occurs on the front or rear wheels of the vehicle.

Whether wheel slip exceeding the allowable wheel slip of the front or rear wheels occurs may be determined using the wheel slip error, a value determined through the difference between the current wheel slip and the target wheel slip.

In the instant case, in the case of the target wheel slip, different target wheel slip rates may be applied to the front and rear wheels based on the selection distribution ratio.

For example, in cases in which the user wants to feel a greater driving force of the rear wheels, by setting the target wheel slip of the rear wheels to be greater than the target wheel slip of the front wheels, more wheel slip is allowed to the rear wheels, to allow the user to feel a stronger riding sensation unique to rear wheel drive.

Furthermore, in the operation of redistributing the driving force, the driving force of the front wheels and the driving force of the rear wheels determined using a driving force distribution ratio exceeding the limit driving force of the driving unit 500 may be redistributed. In the instant case, the limit driving force may be a maximum driving force which may be generated by the driving unit 500, and the driving force that exceeds the limit driving force among the driving force of the front wheels and the driving force of the rear wheels determined using the driving force distribution ratio may be referred to as excess driving force.

In the operation of redistributing driving force, the turning index is used to determine the reduction ratio of driving force exceeding the limit driving force, and the driving force in which the determined reduction ratio is applied to the driving force that exceeds the limit driving force may be transmitted to the driving unit 500 that does not exceed the limit driving force.

The driving force redistribution unit 350 utilizes a reduction ratio determined by the turning index to supplement the driving force that exceeds the limit driving force to meet the user's required driving force as much as possible, and to maintain riding comfort according to the driving force distribution ratio set by the user.

Methods according to various exemplary embodiments of the present disclosure may be implemented in a form of program instructions which may be executed through various computer means and may be recorded on a computer-readable medium. Computer-readable media may include program instructions, data files, data structures, and the like, singly or in combination. Program instructions recorded on a computer-readable medium may be those designed and configured for the present disclosure, or may be known and usable by those skilled in the art of computer software.

Examples of computer-readable media include hardware devices specially configured to store and execute program instructions, such as ROM, RAM, flash memory, and the like. Examples of program instructions include machine language code, such as that produced by a compiler, as well as high-level language code which may be executed by a computer using an interpreter, or the like. The above-described hardware device may be configured to operate with at least one software module to perform the operations of the present disclosure, and vice versa.

As set forth above, in a driving force adjusting device and adjusting method according to an exemplary embodiment of the present disclosure, the riding comfort according to a distribution ratio selected by the user may be maximally increased while securing driving stability of the vehicle.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may be configured to process data according to a program provided from the memory, and may be configured to generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the memory and the processor may be provided as one chip, or provided as separate chips.

In various exemplary embodiments of the present disclosure, the scope of the present disclosure includes software or machine-executable commands (e.g., an operating system, an application, firmware, a program, etc.) for enabling operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In the present specification, unless stated otherwise, a singular expression includes a plural expression unless the context clearly indicates otherwise.

In exemplary embodiments of the present disclosure, "at least one of A and B" may refer to "at least one of A or B" or "at least one of combinations of at least one of A and B". Furthermore, "one or more of A and B" may refer to "one or more of A or B" or "one or more of combinations of one or more of A and B".

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A driving force adjusting apparatus, comprising:
an input unit configured for receiving an input of a selection distribution ratio, which is a ratio of driving force generation of front wheels and rear wheels selected by a user;
a receiving unit configured for receiving driving information of a vehicle including the front wheels and the rear wheels;
a driving force determination unit configured for determining a driving force distribution ratio, which is a driving force generation ratio of the front wheels and the rear wheels, and determining driving force of the front wheels and the rear wheels using the driving force distribution ratio; and
a driving control unit configured for controlling a driving unit generating driving force of the vehicle based on the driving force determined by the driving force determination unit,
wherein the driving force determination unit is configured to adjust the driving force distribution ratio based on the driving information and the selection distribution ratio,
wherein the driving force distribution ratio includes a first driving force distribution ratio,
wherein the driving force determination unit is configured to determine the first driving force distribution ratio in which the selection distribution ratio is reset within a preset initial setting range, as the driving force distribution ratio, and
wherein the initial setting range is a range that limits the selection distribution ratio to secure a preset margin distribution ratio in the front and rear wheels.

2. The driving force adjusting apparatus of claim 1, wherein the initial setting range further includes,
a range in which the front wheels are configured for being driven by the preset margin range even when the selection distribution ratio is input to drive only the rear wheels, or
a range in which the rear wheels are configured for being driven by the preset margin range even when the selection distribution ratio is input to drive only the front wheels.

3. The driving force adjusting apparatus of claim 1, wherein the driving unit includes a first driving unit configured for generating a driving force to at least one of the front or rear wheels of the vehicle, and a second driving unit configured for generating a driving force to another of the front or rear wheels of the vehicle.

4. The driving force adjusting apparatus of claim 1,
wherein the driving force distribution ratio includes a second driving force distribution ratio, and
wherein the driving force determination unit is configured to determine a first additional distribution ratio in consideration of a friction coefficient of a road surface on which the vehicle is traveling and the selection distribution ratio, and additionally applies the first additional distribution ratio to the driving force distribution ratio.

5. The driving force adjusting apparatus of claim 1,
wherein the driving force distribution ratio further includes a third driving force distribution ratio, and
wherein the third driving force distribution ratio is determined by additionally applying a second additional distribution ratio according to occurrence of understeer or oversteer of the vehicle to the driving force distribution ratio.

6. The driving force adjusting apparatus of claim 5, wherein, in response that the vehicle understeers, the second additional distribution ratio is determined according to an understeer index (US Index) indicating a degree to which the understeer has occurred, within a preset marginal additional distribution ratio.

7. The driving force adjusting apparatus of claim 5, wherein, in response that the vehicle oversteers, the second additional distribution ratio is determined by a weight determined by considering at least one of an oversteer index (OS Index) indicating a degree to which the oversteer has occurred, a friction coefficient of a road surface on which the vehicle is traveling, and the selection distribution ratio.

8. The driving force adjusting apparatus of claim 1,
wherein the driving unit includes a first driving unit configured for generating a driving force to at least one of the front wheels or the rear wheels of the vehicle, and a second driving unit configured for generating a driving force to another of the front wheels or the rear wheels of the vehicle, and
wherein the driving force determination unit further includes a driving force redistribution unit that adjusts the driving force of the first driving unit and the driving force of the second driving unit distributed based on the driving force distribution ratio and redistributes the driving force to the first driving unit and the second driving unit.

9. The driving force adjusting apparatus of claim 8, wherein, in response that wheel slip exceeding an allowable wheel slip occurs in one of the first driving unit and the second driving unit, the driving force redistribution unit is configured to reduce the driving force distributed to one of the first driving unit and the second driving unit, in which the wheel slip exceeding the allowable wheel slip has occurred, and to redistribute reduced driving force to another of the first driving unit and the second driving unit.

10. The driving force adjusting apparatus of claim 9, wherein, whether the wheel slip exceeding the allowable wheel slip occurs is determined by whether a wheel slip error determined by a magnitude of a received wheel slip exceeding a target wheel slip, exceeds a preset degree of the wheel slip,
wherein the target wheel slip is a wheel slip required for the vehicle to travel on a target path.

11. The driving force adjusting apparatus of claim 10, wherein the target wheel slip is set individually for the front wheels and the rear wheels, and
in response that the selection distribution ratio is set to be greater for the front wheels than for the rear wheels, a target wheel slip for the front wheels is set to be greater a target wheel slip for the rear wheels, and
in response that the selection distribution ratio is set to be greater for the rear wheels than for the front wheels, the target wheel slip for the rear wheels is set to be greater than the target wheel slip for the front wheels.

12. The driving force adjusting apparatus of claim 8, wherein, in response that the driving force of the first driving unit or the driving force of the second driving unit, distributed based on the driving force distribution ratio, exceeds a limit driving force of the first driving unit or the second driving unit,
the driving force redistribution unit is configured to redistribute excess driving force of the first driving unit or the second driving unit exceeding the limit driving force to the first driving unit or the second driving unit that does not exceed the limit driving force, wherein the limit driving force is a maximum driving force generated by the first driving unit or the second driving unit.

13. The driving force adjusting apparatus of claim 12, wherein the driving force redistribution unit is configured to determine a reduction ratio of the excess driving force based on a turning index, and to redistribute a driving force that reduces the excess driving force using the reduction ratio to the first driving unit or the second driving unit that does not exceed the limit driving force, wherein the reduction ration increases as the turning index increases, and decreases as the turning index decreases, and wherein the driving force redistribution unit redistributes the driving force by multiplying the driving force exceeding the limit driving force by a reduction ratio and transmitting the reduced driving force.

14. A method of adjusting driving force, the method comprising:

receiving an input of a selection distribution ratio, which is a ratio of driving force generation of front wheels and rear wheels selected by a user;

receiving driving information of a vehicle including the front wheels and the rear wheels;

determining a driving force distribution ratio, which is a driving force generation ratio of the front and rear wheels, and determining a driving force of the front and rear wheels using the driving force distribution ratio; and generating driving force to the front and rear wheels based on the driving force determined, wherein in the determining of the driving force, the driving force distribution ratio is adjusted based on the driving information and the selection distribution ratio, wherein in the determining of the driving force, a first driving force distribution ratio in which the selection distribution ratio is reset within a preset initial setting range is determined as the driving force distribution ratio, and wherein the initial setting range is a range set in consideration of a preset margin distribution ratio of the front or rear wheels.

15. The method of claim 14, wherein the driving information includes a driver's required torque, wheel slip information, vehicle's driving speed information, a steering angle, a friction coefficient of a road surface while driving, a yaw rate and yaw acceleration.

16. The method of claim 14, wherein in the determining of the driving force, a first additional distribution ratio is determined in consideration of a friction coefficient of a road surface on which the vehicle is traveling and the selection distribution ratio, and the first additional distribution ratio is additionally applied to the driving force distribution ratio.

17. The method of claim 14, wherein the determining of the driving force is performed by additionally applying a second additional distribution ratio determined differently depending on occurrence of understeer or oversteer of the vehicle.

18. The method of claim 14, further including:

in response that a driving force exceeding a magnitude of wheel slip occurring in the vehicle or a limit driving force of the front or rear wheels is required, redistributing the driving force to the front wheels and the rear wheels by adjusting the driving force of the front wheels and the driving force of the rear wheels distributed based on the driving force distribution ratio.

* * * * *